(12) United States Patent
Bujard et al.

(10) Patent No.: US 7,374,609 B2
(45) Date of Patent: May 20, 2008

(54) OPTICALLY VARIABLE PIGMENTS HAVING AN ASYMMETRICAL LAYER STRUCTURE

(75) Inventors: Patrice Bujard, Reinach (CH); Philippe Bugnon, Le Mouret (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 196 days.

(21) Appl. No.: 10/533,575

(22) PCT Filed: Nov. 12, 2003

(86) PCT No.: PCT/EP03/50817

§ 371 (c)(1), (2), (4) Date: May 3, 2005

(87) PCT Pub. No.: WO2004/046254

PCT Pub. Date: Jun. 3, 2004

(65) Prior Publication Data
US 2006/0027139 A1 Feb. 9, 2006

(30) Foreign Application Priority Data
Nov. 21, 2002 (EP) ................................. 02406007

(51) Int. Cl.
C09D 11/00 (2006.01)
(52) U.S. Cl. .................. 106/31.65; 106/400; 106/481; 106/482; 106/415; 106/404; 257/77
(58) Field of Classification Search ............... 106/400, 106/481, 482, 415, 404; 257/77
See application file for complete search history.

(56) References Cited

U.S. PATENT DOCUMENTS

| 5,766,335 A | 6/1998 | Bujard et al. ............... 106/404 |
| 6,572,784 B1 | 6/2003 | Coombs et al. ......... 252/301.16 |
| 2003/0075079 A1 | 4/2003 | Sommer ..................... 106/442 |
| 2003/0209169 A1* | 11/2003 | Andes et al. ............... 106/415 |
| 2004/0131776 A1 | 7/2004 | Weinert .................. 427/255.7 |
| 2005/0013934 A1* | 1/2005 | Xiong et al. ................ 427/212 |
| 2005/0252410 A1* | 11/2005 | Bujard et al. .............. 106/31.9 |
| 2005/0287090 A1* | 12/2005 | Bujard ........................ 424/63 |

FOREIGN PATENT DOCUMENTS

| EP | 0803549 | 10/1997 |
| WO | 01/57287 | 8/2001 |
| WO | 02/40599 | 5/2002 |

* cited by examiner

Primary Examiner—J. A. Lorengo
Assistant Examiner—Pegah Parvini
(74) Attorney, Agent, or Firm—Joseph C. Suhadolnik

(57) ABSTRACT

The present invention relates to pigments whose particles have a length of from 2 μm to 5 mm, a width of from 2 μm to 2 mm and a thickness of from 50 nm to 1.5 μm and a ratio of length to thickness of at least 2:1, the particles having a core of a metallically reflecting material having two substantially parallel faces, the distance between which is the shortest axis of the core, comprising (a), optionally, on one parallel face of the core, an $SiO_y$ layer wherein $0.95 < y \leq 2.0$, (b), on the $SiO_y$ layer, an $SiO_x$ layer wherein $0.03 < x \leq 0.95$, and (c), on the $SiO_x$ layer, an $SiO_z$ layer wherein $0.95 < z \leq 2.0$, to a method for the production thereof, and to the use thereof in paints, textiles, ink-jet printing, cosmetics, coating compositions, plastics, printing inks and in glazes for ceramics and glass. The pigments without an $SiO_y$ layer produce brilliant colours. The pigments with an $SiO_y$ layer are opaque and exhibit brilliant colours with a metallic appearance.

14 Claims, No Drawings

OPTICALLY VARIABLE PIGMENTS HAVING AN ASYMMETRICAL LAYER STRUCTURE

The present invention relates to pigments comprising (a), optionally, on one parallel face of the core, an $SiO_y$ layer wherein $0.95 < y \leq 2.0$, (b), on the $SiO_y$ layer, an $SiO_x$ layer wherein $0.03 \leq x \leq 0.95$, and (c), on the $SiO_x$ layer, an $SiO_z$ layer wherein $0.95 < z \leq 2.0$, to a method for the production thereof, and to the use thereof in paints, textiles, ink-jet printing, cosmetics, coating compositions, plastics, printing inks and in glazes for ceramics and glass.

EP-A-803 549 relates to coloured gloss pigments having (a1) a core consisting of a substantially transparent or metallically reflecting material and (a2) at least one coating consisting substantially of one or more silicon oxides, wherein the molar ratio of oxygen to silicon is on average from 0.25 to 0.90.

It has now been found, surprisingly, that lightly coloured pigments having a strong metallic effect can be obtained if an $SiO_x$ layer is present on only one parallel face of a metal core, which $SiO_x$ layer is located directly on top of the metal core or is separated from the core by an $SiO_y$ layer.

The present invention accordingly relates to pigments whose particles have a length of from 2 μm to 5 mm, a width of from 2 μm to 2 mm and a thickness of from 50 nm to 1.5 μm and a ratio of length to thickness of at least 2:1, the particles having a core of a metallically reflecting material having two substantially parallel faces, the distance between which is the shortest axis of the core, comprising (a), optionally, on one parallel face of the core, an $SiO_y$ layer wherein $0.95 < y \leq 2.0$, especially $0.95 < y \leq 1.80$, (b), on one parallel face of the core or, if an $SiO_y$ layer is present, on the $SiO_y$ layer, an $SiO_x$ layer wherein $0.03 \leq x \leq 0.95$, especially $0.05 \leq x \leq 0.5$, very especially $0.10 \leq x \leq 0.30$, and (c), on the $SiO_x$ layer, an $SiO_z$ layer, wherein $0.95 < z \leq 2.0$, especially $1.0 \leq z \leq 2.0$, very especially $1.4 \leq z \leq 2.0$, to a method for the production thereof, and to the use thereof in paints, textiles (see, for example, PCT/EP03/11188), inkjet printing (see, for example, PCT/EP03/11189), cosmetics (see, for example, PCT/EP03/02196), coating compositions, plastics, printing inks and in glazes for ceramics and glass.

In a preferred embodiment the present invention relates to pigments whose particles have a length of from 2 μm to 5 mm, a width of from 2 μm to 2 mm and a thickness of from 50 nm to 1.5 μm and a ratio of length to thickness of at least 2:1, the particles having a core of a metallically reflecting material having two substantially parallel faces, the distance between which is the shortest axis of the core, comprising (a), optionally, on one parallel face of the core, an $SiO_y$ layer, wherein $0.95 < y \leq 1.80$, especially $1.0 \leq y \leq 1.80$, very especially $1.40 \leq y \leq 1.80$, (b), on one parallel face of the core or, if an $SiO_y$ layer is present, on the $SiO_y$ layer, an $SiO_x$ layer wherein $0.03 \leq x \leq 0.95$, especially $0.05 \leq x \leq 0.5$, very especially $0.10 \leq x \leq 0.30$, and (c), on the $SiO_x$ layer, an $SiO_z$ layer, wherein $1.0 < z \leq 2.0$, especially $1.4 \leq z \leq 2.0$, very especially $z = 2.0$.

The pigment particles preferably have lengths and widths of from 5 to 20 μm and a thickness of from 60 nm to 1.0 μm.

The pigment flakes of the present invention are not of a uniform shape. Nevertheless, for purposes of brevity, the flakes will be referred to as having a "diameter." It is presently preferred that the diameter of the flakes be in a preferred range of about 1 to 60 μm, especially 2 to 50 μm, with a more preferred range of about 5-40 μm. Accordingly, the aspect ratio (ratio of diameter to thickness) is from 2:1 to 1200:1, especially 7:1 to 258:1.

"$SiO_y$ or $SiO_z$ wherein $0.95 < y$ or $z \leq 2.0$" means that the molar ratio of oxygen to silicon is on average from >0.95 to 2.0.

"$SiO_x$ wherein $0.03 \leq y \leq 0.95$" means that the molar ratio of oxygen to silicon is on average from 0.03 to 0.95.

According to the present invention the term "aluminum" comprises aluminum and alloys of aluminum. Alloys of aluminum are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, chromium and/or iron in amounts of less than 20% by weight, preferably less than 10% by weight.

As metallically reflecting material preference is given to Ag, Al, Au, Cu, Cr, Ge, Mo, Ni, Ti, Zn, alloys thereof, graphite, $Fe_2O_3$ or $MoS_2$. Special preference is given to Al.

The thickness of the metallic core depends on the metallic material used and is, for example, in the case of aluminum from 20 to 100 nm, preferably from 40 to 60 nm.

The thickness of the $SiO_y$ layer (a) is generally from 20 to 500 nm, preferably from 100 to 500 nm.

The thickness of the $SiO_x$ layer (b) is generally from 5 to 200 nm, preferably from 5 to 100 nm.

The thickness of the $SiO_z$ layer (c) is generally from 1 to 100 nm, preferably from 5 to 100 nm, especially from 10 to 50 nm.

Preparation of the pigments according to the invention will be explained in greater detail hereinbelow with reference to aluminum as metal:

The aluminum flakes coated with $SiO_x$ and/or $SiO_y$ can in principle be obtained by means of a method comprising the following steps (EP-B-990 715):

a) vapor-deposition of a separating agent onto a carrier to produce a separating agent layer, b) vapor-deposition of an Al layer onto the separating agent layer, c) optionally, vapor-deposition of an $SiO_y$ layer onto the Al layer, d) vapor-deposition of an $SiO_x$ layer onto the Al layer or, if present, onto the $SiO_y$ layer, wherein $0.95 \leq y \leq 1.80$, especially $1.0 \leq y \leq 1.80$, very especially $1.1 \leq y \leq 1.50$, e) optionally, vapor-deposition of an $SiO_y$ layer onto the $SiO_x$ layer, f) dissolution of the separating agent layer in a solvent, g) separation of the $SiO_x$-coated aluminum flakes from the solvent.

The $SiO_y$ layer is preferably vapor-deposited from a vaporizer in which a charge comprising a mixture of Si and $SiO_2$, $SiO_y$ and mixtures thereof is present.

The $SiO_x$ layer is produced by vaporizing silicon in the presence of oxygen, it being possible to control, precisely, the ratio of silicon to oxygen at a specific vapor-deposition rate by adjusting the partial pressure of the oxygen (see, for example, EP-A-803 549).

The method mentioned hereinbefore makes available $SiO_x$-coated or $SiO_y/SiO_x$-coated aluminum flakes that have a high degree of plane parallelism and a defined thickness in the region of ±10%, preferably ±5%, of the average thickness.

The $SiO_y$ layers are obtained by heating a preferably stoichiometric mixture of fine silicon and quartz ($SiO_2$) powder in a vaporizer described, for example, in DE 4 342

574 C1 and in U.S. Pat. No. 6,202, 591 to more than 1300° C. under a high vacuum. The reaction product is silicon monoxide gas, which is directed in vacua directly onto the passing carrier, on which it is condensed as SiO. It is also possible to use non-stoichiometric mixtures. The charge present in the vaporizer comprises a mixture of Si and $SiO_2$, $SiO_y$, and mixtures thereof, the particle size of the substances reacting with one another (Si and $SiO_2$) advantageously being less than 0.3 mm. The weight ratio of Si to $SiO_2$ is advantageously in the range from 0.15:1 to 0.75:1 (parts by weight); preferably, a stoichiometric mixture is present. $SiO_y$ present in the vaporizer vaporizes directly. Si and $SiO_2$ react at a temperature of more than 1300° C. to form silicon monoxide vapor.

The separating agent vapor-deposited onto the carrier in step a) may be a lacquer (surface coating), a polymer, such as, for example, the (thermoplastic) polymers, in particular acryl- or styrene polymers or mixtures thereof, as described in U.S. Pat. No. 6,398,999, an organic substance soluble in organic solvents or water and vaporizable in vacua, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably an inorganic salt soluble in water and vaporizable in vacuo (see, for example, DE 198 44 357), such as sodium chloride, potassium chloride, lithium chloride, sodium fluoride, potassium fluoride, lithium fluoride, calcium fluoride, sodium aluminum fluoride and disodium tetraborate.

Usually, step f) is carried out at a pressure which is higher than the pressure in steps a) to e) and lower than atmospheric pressure.

The (movable) carrier preferably comprises one or more continuous metal belts, with or without a polymer coating, or one or more polyimide or polyethylene terephthalate belts. The movable carrier may furthermore comprise one or more discs, cylinders or other rotationally symmetrical bodies, which rotate about an axis.

The $SiO_x$-coated aluminum flakes are separated from the separating agent solvent preferably by washing-out and subsequent filtration, sedimentation, centrifugation, decanting or evaporation. Furthermore, the $SiO_x$-coated aluminum flakes may, after washing-out of the dissolved separating agent contained in the solvent, be frozen together with the solvent and subsequently subjected to a process of freeze-drying, whereupon the solvent is separated off as a result of sublimation below the triple point and the dry flakes remain behind in the form of individual plane-parallel structures.

The condensed silicon suboxide corresponds to the formula $SiO_y$ wherein $0.95 < y \leq 1.8$, preferably wherein approximately $1 \leq y \leq 1.5$, y values of less than 1 being achieved by means of an excess of silicon in the vaporizer material. $SiO_y$ wherein $y > 1.0$ is obtained by vaporizing SiO in the presence of oxygen. Except under an ultra-high vacuum, in industrial vacuums of a few $10^{-2}$ Pa vaporized SiO always condenses as $SiO_y$ wherein $1 \leq y \leq 1.8$, especially wherein $1.1 \leq y \leq 1.8$, because high-vacuum apparatuses always contain, as a result of gas emission from surfaces, traces of water vapor which react with the readily reactive SiO at vaporization temperature.

As a result of the so-called reactive vaporization of SiO in a pure oxygen atmosphere it is possible to obtain, for example, $SiO_{1.5}$ layers which do not absorb in the visible range and the refractive index of which at 550 nm is 1.55 (E. Ritter, J. Vac. Sci Technol. 3 (1966) 225).

Substantially absorption-free layers are obtained if the growing $SiO_y$ layer is irradiated with UV light during the vapor-deposition procedure (DE-A-1 621 214).

In detail, a salt, for example NaCl, followed successively by layers of aluminum, optionally $SiO_y$, and $SiO_x$ are vapor-deposited onto a carrier, which may be a continuous metal belt, passing by way of the vaporizers under a vacuum of <0.5 Pa. The thicknesses of salt vapor-deposited are about from 20 to 100 nm, preferably from 30 to 60 nm, those of aluminum from 20 to 100 nm, those of $SiO_y$ from 20 to 500 nm and those of $SiO_x$ from 5 to 200 nm. On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^9$ Pa pressure, and especially from $10^3$ to $5 \times 10^3$ Pa pressure, where it is immersed in a dissolution bath. The temperature of the solvent should be so selected that its vapor pressure is in the indicated pressure range. With mechanical assistance, the separating agent layer rapidly dissolves and the product layer breaks up into flakes, which are then present in the solvent in the form of a suspension. On its further course, the belt is dried and freed from any contaminants still adhering to it. It runs through a second group of dynamic vacuum lock chambers back into the vaporization chamber, where the process of coating with separating agent and product layer is repeated.

The suspension then present in both cases, comprising product structures and solvent, and the separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by filtration, sedimentation, centrifugation, decanting or evaporation and dried.

Separating off the plane-parallel structures after washing-out at atmospheric pressure can be carried out under gentle conditions by freezing the suspension, which has been concentrated to a solids content of about 50%, and subjecting it in known manner to freeze-drying at about −10° C. and 50 Pa pressure. The dry substance remains behind as product, which can be subjected to the steps of further processing by means of coating or chemical conversion.

Instead of using a continuous belt, it is possible to produce the product by carrying out the steps of vapor-deposition of separating agent and $SiO_x$, Al and $SiO_y$, of dissolution, and of drying the carrier, in an apparatus having a rotary body, in accordance with DE-A-199 52 032. The rotary body may be one or more discs, a cylinder or any other rotationally symmetrical body.

If, under industrial vacuums of a few $10^{-2}$ Pa, Si is vaporized instead of $SiO_y$, silicon oxides that have a less-than-equimolar oxygen content are obtained, that is to say $SiO_x$ wherein $0.03 \leq x \leq 0.95$ especially $0.05 \leq x \leq 0.5$, very especially $0.10 \leq x\ 0.3$, which have astonishingly high stability to oxidation along with a high refractive index, even in thin layers. Heating in the presence of oxygen at from 150 to 500° C., preferably from 175 to 300° C., unexpectedly results in a very thin, for example approximately 20 nm thick, superficial silicon dioxide layer, which is a very convenient method of producing structures having the layer sequence Al/SiO$_x$/SiO$_2$. If thicker silicon dioxide layers are desired, they may conveniently be produced, as described above, by means of vapor-deposition of SiO$_y$ and oxidative heat treatment thereof or by wet-chemical coating of the flakes with SiO$_2$.

For oxidative heat treatment, air or some other oxygen-containing gas is passed through the platelets, which are, for example, in the form of loose material or in a fluidised bed, at a temperature of more than 200° C., preferably more than 400° C. to oxidise the SiO$_y$.

Accordingly, an SiO$_z$ layer can be produced as described above, by means of vapor deposition of SiO$_y$ and optionally oxidative heat treatment thereof.

For wet-chemical coating of the flakes with SiO$_2$, the following method, for example, may be used: a soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes (see, for example, WO98/53011). A first preferred embodiment of the present invention relates to pigments whose particles have a length of from 2 µm to 5 mm, a width of from 2 µm to 2 mm and a thickness of from 50 nm to 1.5 µm and a ratio of length to thickness of at least 2:1, the particles having a core of aluminum having two substantially parallel faces, the distance between which is the shortest axis of the core, comprising (b), on one parallel face of the core, an SiO$_x$ layer wherein $0.03 \leq x \leq 0.95$, and (c), on the SiO$_x$ layer, an SiO$_2$ layer wherein $0.03 \leq x \leq 0.95$, especially wherein $0.05 \leq x \leq 0.5$, very especially wherein $0.10 \leq x \leq 0.30$.

The thickness of the aluminum core in that embodiment is from 20 to 100 nm, preferably from 40 to 60 nm. The thickness of the SiO$_x$ layer (b) in that embodiment is from 5 to 200 nm, preferably from 5 to 100 nm. The thickness of the SiO$_2$ layer (c) in that embodiment is from 5 to 100 nm, preferably from 10 to 50 nm.

A second preferred embodiment of the present invention relates to pigments whose particles have a length of from 2 µm to 5 mm, a width of from 2 µm to 2 mm and a thickness of from 50 nm to 1.5 µm and a ratio of length to thickness of at least 2:1, the particles having a core of aluminum having two substantially parallel faces, the distance between which is the shortest axis of the core, comprising (a), on one parallel face of the core, an SiO$_y$ layer wherein $0.95 < y \leq 1.8$, (b), on the SiO$_y$ layer, an SiO$_x$ layer wherein $0.03 \leq x \leq 0.95$, and (c), on the SiO$_x$ layer, an SiO$_z$ layer, wherein $1.0 \leq z \leq 2.0$, especially $1.4 \leq z \leq 2.0$, very especially $z=2.0$.

The SiO$_z$ layer may, as described hereinbefore, be converted into an SiO$_2$ layer, as a result of which there are obtained pigments whose particles have a length of from 2 µm to 5 mm, a width of from 2 µm to 2 mm and a thickness of from 50 nm to 1.5 µm and a ratio of length to thickness of at least 2:1, the particles having a core of aluminum having two substantially parallel faces, the distance between which is the shortest axis of the core, comprising (a), on one parallel face of the core, an SiO$_y$ layer wherein $0.95 < y \leq 1.8$, (b), on the SiO$_y$ layer, an SiO$_x$ layer wherein $0.03 \leq x \leq 0.95$, and (c), on the SiO$_x$ layer, an SiO$_2$ layer.

The thickness of the aluminum core in that embodiment is from 20 to 100 nm, preferably from 40 to 60 nm. The thickness of the SiO$_y$ layer (a) in that embodiment is from 20 to 500 nm, preferably from 100 to 500 nm. The thickness of the SiO$_x$ layer (b) in that embodiment is from 5 to 200 nm, preferably from 5 to 100 nm. The thickness of the SiO$_2$ layer (c) in that embodiment is from 5 to 100 nm, preferably from 10 to 50 nm.

In order to improve the physical and/or chemical properties of the pigments, further layers may be deposited.

According to R. Besold, Aluminiumpigmente für wässrige Beschichtungen—Widerspruch oder Wirklichkeit?, Farbe+Lack 97(1991)311-314, a large number of procedures, which can be divided into two groups, are known for the stabilisation of aluminum pigments:

adsorption of corrosion inhibitors on the pigment surface
    phosphoric acid esters: DE-A-3020073, EP-A-1 70474, EP-A-1 33644, U.S. Pat. Nos. 4,565,716, 4,808,231,
    phosphates and phosphites: U.S. Pat. Nos. 4,565,716, 4,808,231, EP-A-240367,
    vanadates: EP-A-305560, EP-A-104075,
    chromates: U.S. Pat. Nos. 2,904,523, 4,693,754, EP-A-259592,
    dimeric acids: DE-A-3002175, and
encapsulation of the pigments with a continuous inorganic protective layer:
    SiO$_2$: U.S. Pat. Nos. 2,885,366, 3,954,496,
    Fe$_2$O$_3$: DE-A-3003352,
    TiO$_2$: DE-A-381 3335, or organic protective layer:
    DE-A-3630356, DE-A-3147177, EP-A-477433, especially resins modified with phosphoric acid: EP-A-170474, CA-A-1,273,733, AT-A-372696, DE-A-3807588, EP-A-319971.

It is, for example, possible for the finished pigment to be subjected to subsequent coating or subsequent treatment which further increases the light, weather and chemical stability or which facilitates handling of the pigment, especially incorporation in various media. For example, the methods described in DE-A-22 15 191, DE-A-31 51 354, DE-A-32 35 017 or DE-A-33 34 598 are suitable for subsequent treatment and/or subsequent coating.

Further metal oxide layers, especially TiO$_2$ or ZrO$_2$ layers, may, furthermore, be applied to the pigments in order to improve the colour effects, preferably by wet-chemical means. For that purpose the pigments are suspended in water and, by adding one or more metal salt solutions at a pH value which is suitable for deposition of the metal oxides or metal hydroxides in question, are coated with a smooth metal oxide or hydroxide layer. It is also possible for mixed oxide or hydroxide layers to be deposited. Wet-chemical coating is known and described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, and WO 98/53001.

The pigments according to the invention are distinguished by very uniform thickness, as a result of which very high colour purity and intensity is achieved.

Metallic or non-metallic, inorganic platelet-shaped particles or pigments are effect pigments, (especially metal effect pigments or interference pigments), that is to say, pigments that, besides imparting colour to an application medium, impart additional properties, for example angle dependency of the colour (flop), lustre (not surface gloss) or texture. On metal effect pigments, substantially oriented reflection occurs at directionally oriented pigment particles. In the case of interference pigments, the colour-imparting effect is due to the phenomenon of interference of light in thin, highly refractive layers.

The (effect) pigments according to the invention can be used for all customary purposes, for example for colouring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995).

When the pigments according to the invention are interference pigments (effect pigments), they are goniochromatic and result in brilliant, highly saturated (lustrous) colours. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP-A-388 932 or EP-A-402 943, when the colour of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The (effect) pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10°, a difference in hue (ΔH*) of from 20 to 340, especially from 150 to 210.

Preferably, the (effect) pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the (effect) pigments according to the invention, where appropriate together with customary additives such as, for example, fillers, other pigments, siccatives or plastcisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The colorations obtained, for example in plastics, coatings or printing inks, especially in coatings or printing inks, more especially in coatings, are distinguished by excellent properties, especially by extremely high saturation, outstanding fastness properties, high color purity and/or high goniochromicity.

When the high molecular weight material being pigmented is a coating, it is especially a speciality coating, very especially an automotive finish.

The (effect) pigments according to the invention are also suitable for making-up the lips or the skin and for colouring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additves) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers);

suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindi, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof, panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers. If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

In a vacuum installation constructed in its fundamental points analogously to the installation described in U.S. Pat. No. 6,270,840, there are vaporized from vaporizers, in succession, sodium chloride (90 nm, NaCl) as separating agent at about 900° C., aluminum (90 nm) at about from 1400 to 1500° C., $SiO_y$(150 nm, y=1.0±5%) as reaction product of Si and $SiO_2$ at from 1350 to 1550° C. and Si (120 nm, $SiO_x$ wherein x=0.3±10%) at a temperature of about 1 600° C. Vaporization is carried out at about 0.02 Pa. For subsequent detachment of the layers by dissolution of the separating agent, the carrier on which vapor-deposition has been carried out is sprayed at about 3000 Pa with deionised water and treated using mechanical assistance by means of scrapers and using ultrasound. The NaCl passes into solution and the product layer, which is insoluble, breaks up into flakes. The suspension is removed continuously from the dissolution chamber and, at atmospheric pressure, is concentrated by filtration and rinsed several times with deionised water in order to remove $Na^+$ and $Cl^-$ ions that are present. After drying and grinding, flakes are obtained whose average largest diameter is in the range from 20 to 40 μm.

Application Example 1

An ink having the following composition is prepared:

| | |
|---|---|
| nitrocellulose A250 | 10.5% |
| Dowanol ® PM | 8.5% |
| ethyl acetate | 19% |
| ethanol | 57% |
| pigment flakes from Example 1 | 5% |

The pigment flakes from Example 1 are dispersed in the composition by stirring. The ink is applied to a contrast paper in a wet-layer thickness of 36 μm. After drying, the opaque print exhibits a brilliant metallic, slightly greenish colour. The reflection colour (CIE-L*, C*h) is measured on a white background illuminated with $D_{65}$ standard light at a viewing angle of 10 degrees (CIE (1964), Datacolor D3890).

$L^*$(brightness)=83, $C^*$(saturation)=7 and $h$ (hue)= 110

Example 2

The flakes obtained in Example 1 before grinding, on the surface of which is a natural $SiO_2$ layer having a thickness of about from 1 to 2 nm, can be calcined in the form of loose material in an oxygen atmosphere at from 200 to 300° C. for several hours in order to increase the fastness to weathering and light fastness, the thickness of the $SiO_2$ layer increasing to about 20 nm.

The invention claimed is:

1. A platelet-like pigment whose particles have a length of from 2 μm to 5 mm, a width of from 2 μm to 2 mm and a thickness of from 50 nm to 1.5 μm and a ratio of length to thickness of at least 2:1, the particles having a core of a metallically reflecting material having two substantially parallel faces, the distance between which is the shortest axis of the core, comprising
   (a) on one parallel face of the core, an $SiO_y$ layer wherein $0.95<y\leq2.0$, wherein the thickness of the $SiO_y$ layer (a) is from 20 to 500 nm
   (b) on the $SiO_y$ layer, an $SiO_x$ layer wherein $0.03\leq x\leq0.95$, and
   (c) on the $SiO_x$ layer, an $SiO_z$ layer, wherein $0.95<z\leq2.0$ wherein the metallically reflecting material is selected from Ag, Al, Au, Cu, Cr, Ge, Mo, Ni, Ti, Zn, alloys thereof, graphite, $Fe_2O_3$ and $MoS_2$ and the thickness of the core is from 20 to 100 nm.

2. A pigment according to claim 1, comprising
   (a) on one parallel face of the core, an $SiO_y$ layer, wherein $0.95<y\leq1.80$,
   (b) on the $SiO_y$ layer, an $SiO_x$ layer wherein $0.03\leq x\leq0.95$, and
   (c) on the $SiO_x$ layer, an $SiO_z$ layer, wherein $1.0<z\leq2.0$.

3. A pigment according to claim 1, wherein the thickness of the $SiO_x$ layer (b) is from 5 to 200 nm.

4. A method for producing the pigment according to claim 1, comprising the following steps:
   a) vapor-deposition of a separating agent onto a carrier to produce a separating agent layer,
   b) vapor-deposition of an Al layer onto the separating agent layer,
   c) vapor-deposition of an $SiO_y$ layer onto the Al layer,
   d) vapor-deposition of an $SiO_x$ layer onto the $SiO_y$ layer, wherein $0.95\leq y\leq1.80$,
   e) vapor-deposition of an $SiO_y$ layer onto the $SiO_x$ layer,
   f) dissolution of the separating agent layer in a solvent,
   g) separation of the coated aluminum flakes from the solvent.

5. A pigment obtained by the method of claim 4.

6. A composition comprising a pigment according to claim 1.

7. A paint, textile, ink-jet printing, cosmetic, coating, plastic, or printing ink composition or a glaze for ceramics and glass comprising a pigment according to claim 1.

8. A pigment according to claim 1, wherein $0.05\leq x\leq0.5$.

9. A pigment according to claim 2, wherein $1.0\leq y\leq1.80$, and $1.4\leq z\leq2.0$.

10. A pigment according to claim 1, wherein the thickness of the core is from 40 to 60 nm.

11. A pigment according to claim 1, wherein the thickness of the $SiO_x$ layer (b) is from 5 to 100 nm.

12. A pigment according claim 1, wherein the thickness of the $SiO_y$ layer (a) is from 100 to 500.

13. A pigment according claim 3, wherein the thickness of the $SiO_y$ layer (a) is from 20 to 500 nm.

14. A method according to claim 4, wherein $1.0 \leq y \leq 1.80$.

* * * * *